United States Patent Office 3,564,059
Patented Feb. 16, 1971

3,564,059
PERFLUORINATED ETHERS AND POLYETHERS
Dario Sianesi, Milan, Renzo Fontanelli, Rome, and
Gerardo Caporiccio, Milan, Italy, assignors to Montecatini Edison S.p.A., Milan, Italy
No Drawing. Filed July 24, 1967, Ser. No. 655,665
Claims priority, application Italy, July 26, 1966,
17,332/66; Dec. 16, 1966, 792,673/66
Int. Cl. C07c 43/12, 49/04, 91/40
U.S. Cl. 260—594
4 Claims

ABSTRACT OF THE DISCLOSURE

Fluorinated compounds and mixtures thereof of the general formula

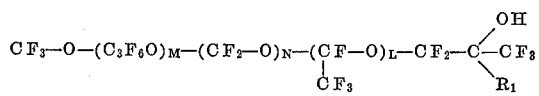

wherein M, N and L may be the same or different numbers and are zero or a whole number from 1 to 100, the sum of $M+N+L$ is zero or a number between 1 and 100, the ratio of $$\frac{N+L}{M+1}$$

is a number between zero and 2, $C_3F_6$ represents the unit derived from the opening of the double bond of a molecule of hexafluoropropylene, the different perfluoroalkylene units having a random distribution along the polymer chain, and $R_1$ is selected from the group consisting of —OH, —OR$_2$, —CN, and —NR$_3$R$_4$, wherein $R_2$ is a radical containing from 1 to 12 carbon atoms, and is alkyl, alkylaryl, aryl, cycloalkyl or is the corresponding halogen-substituted radical, and $R_3$ and $R_4$ may be hydrogen or the same or different radicals containing from 1 to 12 carbon atoms and are selected from the group consisting of alkyl, alkylaryl, aryl, halogen-substituted aryl, cycloalkyl, and the derivatives thereof having one or more molecules of water of hydration are prepared by reacting corresponding perfluorinated ketones and mixtures thereof of the general formula

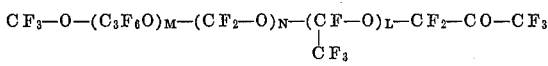

with a reactant selected from the group consisting of water, primary, secondary or tertiary alcohols, HCN, NaCN ammonia, primary and secondary aliphatic amines, aniline, diphenylamine, anilines halo- and alkyl-substituted in the nucleus and diphenylamines halo- and alkyl-substituted in the nucleus, at a temperature of from about —40° to +150° C. and under a pressure of from about 0.1 to 50 atmospheres. These products are useful as plasticizers and solvents for halogenated polymers.

BACKGROUND OF THE INVENTION

Field of the invention

The present invention relates to new polyether compounds and mixtures thereof containing fluorine and to a process for their preparation.

More particularly the invention relates to new classes of chemical products obtained by an addition reaction between any of a number of specified common chemical reactants and perfluorinated ethers and polyethers containing a ketonic functional group and mixtures thereof of the general formula

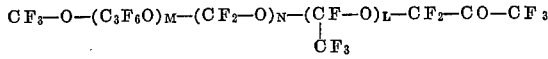

wherein M, N and L may be the same or different numbers and are zero or a whole number from 1 to 100, the sum of $M+N+L$ is zero or a number between 1 and 100, the ratio $$\frac{N+L}{M+1}$$

is a number between zero and 2, and preferably between zero and 1, $C_3F_6$ represents the unit derived from the opening of the double bond of a molecule of hexafluoropropylene, the different perfluoroalkylene units having a random distribution along the polymer chain.

The foregoing ethers and polyethers and mixtures thereof have been described in the Italian patent application, provisional filing No. 20,067, filed on July 11, 1966, and in our U.S. patent application titled "Fluorinated Ketones and Process for Their Preparation," Ser. No. 651,128, filed July 5, 1967, now Pat. No. 3,513,203.

SUMMARY OF THE INVENTION

It has now been found that the foregoing compounds will react with various organic and inorganic reactants by an addition reaction that is of general application, leading to the formation of a number of products which form new classes.

The new fluorinated compounds of the present invention are of the following general formula

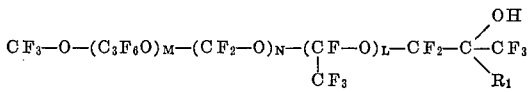

in which M, N and L may be the same or different numbers and are zero or a whole number from 1 to 100, the sum of $M+N+L$ is zero or a number between 1 and 100, the ratio $$\frac{N+L}{M+1}$$

is a number between zero and 2, and preferably between zero and 1, $C_3F_6$ represents the unit derived from the opening of the double bond of a molecule of hexafluoropropylene, the different perfluoroalkylene units having a random distribution along the polymer chain, and $R_1$ is selected from the group consisting of —OH, —OR$_2$, —CN and —NR$_3$R$_4$, wherein $R_2$ is an alkyl, alkylaryl, aryl or cycloalkyl radical containing from 1 to 12 carbon atoms and may be halogen-substituted, and wherein $R_3$ and $R_4$ may be the same or different and are selected from the group consisting of hydrogen, alkyl, alkylaryl, aryl, halogen-substituted aryls, and cycloalkyl radicals containing from 1 to 12 carbon atoms, and the derivatives thereof having one or more molecules of water of hydration.

The present invention further relates to a process for the preparation of fluorinated compounds of the general formula

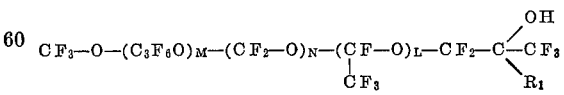

wherein M, N and L and $R_1$ are as previously defined, this process comprising reacting perfluorinated ketones and mixtures thereof of the general formula

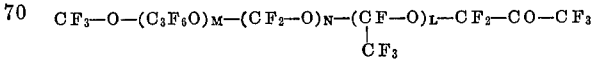

wherein M, N and L may be the same or different numbers and are zero or a whole number from 1 to 100, the sum of $M+N+L$ is zero or a number between 1 and 100, the ratio $$\frac{N+L}{M+1}$$

is a number between zero and 2, and preferably between zero and 1, $C_3F_6$ represents the unit derived from the opening of the double bond of a molecule of hexafluoropropylene, the different perfluoroalkylene units having a random distribution along the polymer chain, with a reactant selected from the group consisting of water, primary, secondary or tertiary alcohols, HCN, NaCN, ammonia, primary or secondary aliphatic amines, aniline, diphenylamine, anilines halo- and alkyl-substituted in the nucleus, and diphenylamines halo- and alkyl-substituted in the nucleus, at a temperature of from about $-40°$ to $+150°$ C., and under a pressure of from about 0.1 to 50 atmospheres, and preferably under a pressure of from about 0.5 to 10 atmospheres.

DESCRIPTION OF THE PREFERRED EMBODIMENTS

The reaction may be carried out in the absence or in the presence of a solvent or dispersing agent. As the solvent or dispersing medium there may be used an excess of the same liquid reactant with which the perfluorinated ketone is reacted. Other diluent liquid media that may be used include, e.g., ethers, saturated halogenated and non-halogenated hydrocarbons, and the like.

The novel compounds of the present invention may be used as plasticizers and solvents for halogenated polymers, and specially for fluorine-containing polymers such as for example the elastomeric copolymers of vinylidene fluoride with fluorinated propylenes; said polymers can be thus plasticized with from about 1 to 20% by weight of the products according to this invention, in order to decrease the characteristics of hardness and rigidity thereof, specially at the low temperatures. The compounds of this invention are favored in their activity as plasticizers and solvents because the affinity thereof for products having different degrees of fluorination may be varied within a wide range by proper selection of the organic radical $R_1$; to thereby vary, as desired the ratio between the organic-hydrocarbon part of the molecule and the essentially perfluorinated part. Furthermore, it is clearly manifest to the persons skilled in the art that the compounds of this invention, because of the presence in said compounds of both an essentially perfluorinated molecular chain (that might be quite long) and of one or more functional groups of polar nature (OH, CN, $NH_2$, etc.) at one end of the chain, are particularly suitable as surface active agents to lower the surface tension of aqueous solutions, and as auxiliary agents for the treatments of paper and fabrics in order to impart characteristics of water- and oil-repellency. In fact, the reactive functional groups present in the instant compounds are suitable to form chemical linkages with the molecules of several natural and synthetic fibres.

The following examples will further illustrate our invention. All parts are by weight unless otherwise stated.

EXAMPLE 1

A sample of 5 g. of $CF_3$—O—$CF_2$—CO—$CF_3$ was treated at a temperature of about 0° C. with an equimolar amount of anhydrous ethyl alcohol. An exothermic reaction occurred. After 30 minutes the product obtained was distilled at atmospheric pressure at 110°–115° C.

5.3 g. of the following hemiketal were obtained:

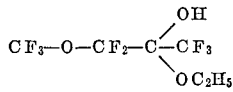

Percent theoretical: C=25.92; F=54.67; H=2.16; O=17.26. Percent found: C=25.85; F=54.1; H=3.02; O=17.03.

EXAMPLE 2

A reaction analogous to that of Example 1 was carried out by adding water rather than ethyl alcohol. There were obtained 4.9 g. of the solid hydroxide,

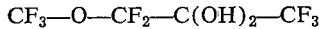

having a melting temperature of 19–20° C.

Percent theoretical: C=19.20; F=60.80; O=19.2; H=.080. Percent found: C=19.15; F=60.15; O=19.79; H=.091.

EXAMPLE 3

5 cc. of aqueous ammonia (10% $NH_3$) are slowly added to 5.6 of

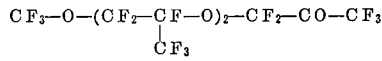

During the addition it was noted that the organic layer showed an increase in viscosity and became light yellow.

The whole was allowed to react with agitation at a temperature between 20 and 50° C. for 30 minutes. The lower organic layer was separated, dried on $Na_2SO_4$, and distilled, thereby collecting a fraction with a boiling point of 171–173° C., corresponding to

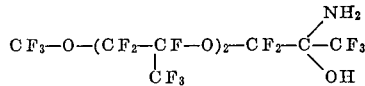

Percent theoretical: C=20.66; F=65.40; N=2.41; H=0.052; O=11.02. Percent found: C=20.8; F=64.7; N=2.3; H=0.04; O=11.8.

EXAMPLE 4

A stream of 1 liter/hour of gaseous ammonia was passed through a sample of 10 g. of a mixture of ketones of the formula $CF_3$—O—$(C_3F_6O)_n$—$CF_2$—CO—$CF_3$, in which $n$ has an average value=10 at a temperature of 30° C. As the reaction proceeded, the viscosity of the liquid phase gradually increased until, after 4 hours, the adsorption of ammonia ceased. The residual product was heated to 100° C. under a vacuum of 15 mm. Hg. After this treatment, examination of the infrared absorption spectrum of the product showed the total absence of the characteristic bands of the group —CO—$CF_3$ (1803 cm.$^{-1}$) and the presence of bands in the zone of 3650–3100 cm.$^{-1}$, characteristic of —OH and —$NH_2$ groups.

The product obtained had the average formula $$CF_3—O(C_3F_6O)_n—CF_2—C(OH)(NH_2)—CF_3$$

with $n$ having an average value of 10, as indicated in the spectroscopic and molecular weight determinations.

EXAMPLE 5

In a 50 cc. glass vessel, provided with stirrer and reflux condenser and kept under an inert atmosphere, 5 g. of a ketone of the formula $CF_3$—O—$CF_2$—CO—$CF_3$ were contacted with a solution of 2.5 g. of aniline in 10 cc. of anhydrous ethyl ether.

A slightly exothermic reaction occurred for a period of 30 minutes at the boiling temperature of the mixture (about 35° C.).

Thereafter, at room temperature and under a pressure of about 100 mm. Hg, ⅔ of the solvent were evaporated and the precipitated solid was then separated by filtration.

This solid (3.5 g.) was crystallized twice from a mixture (1:1 by volume) of benzene and pentane, and then washed with cold pentane. The solid product sublimed at 105–110° C. and melted at 137°–139° C.

The elemental analysis (C=30.05; H=2.22; F=49.70; N=4.61%) and the examination of the infrared (I.R.) and nuclear magnetic resonance (N.M.R.) spectra showed the product to be the compound of the formula

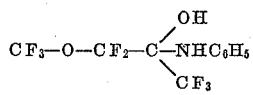

that is, the addition compound of aniline to the original ketone.

EXAMPLE 6

A sample of 5 g. of the ketone $$CF_3—O—C_3F_6—O—CF_2—CO—CF_3$$

B.P. 85–87° C. at 760 mm. Hg, was reacted with 2 cc. of anhydrous methanol at a temperature of 50° C. for 2 hours.

Thereafter, there was separated by fractional distillation a fraction of 4 g., having a boiling temperature between 63° and 64° C. at 28 mm. Hg corresponding to the product:

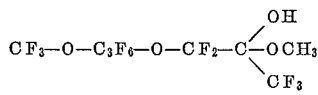

1 g. of this product was reacted at 0° C. with diazomethane, $CH_2N_2$, dissolved in a $CF_2ClCFCl_2$ solution, thus obtaining after evaporation of the solvent and rectification, 0.9 g. of a product having a boiling temperature of 152–153° C. and an elemental composition corresponding to the formula $$CF_3—O—C_3F_6—O—CF_2—C(OCH_3)_2CF_3$$

characterized by the presence, in the I.R. absorption spectrum, of characteristic bands in the zone 2850–3000 cm.$^{-1}$ and 1935–1970 cm.$^{-1}$. Bands in the positions 1803 cm.$^{-1}$ and 3550–3600 cm.$^{-1}$, which are characteristic of the carbonyl and hydroxy group, were no longer present.

EXAMPLE 7

0.9 cc. of anhydrous diethylamine were added to a sample of 5 g. of a ketone of the formula $$CF_3—O—(C_3F_6—O)_2—CF_2—CO—CF_3$$

B.P. 137° C. The reaction was exothermic and the temperature was kept at 50° C. until completion of the reaction. The reaction product was subjected to rectification, collecting 4.5 g. of a fraction having a B.P. of 193–195° C. at 760 mm. Hg and containing: C=26.2%, F=60.2%, N=2.1% and H=1.5%, corresponding to the formula

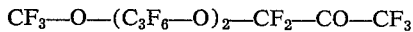

EXAMPLE 8

A sample of 8 g. of a ketone of the formula $$CF_3—O—C_3F_6—O—CF_2—CO—CF_3$$

was slowly added over a 2 hour period to a suspension of 0.98 g. of NaCN in 15 cc. of anhydrous tetrahydrofurane while agitating at a temperature of 5° C. During the reaction the NaCN salt was dissolved and the solution became orange.

Thereafter, the solvent was evaporated under vacuum and there were obtained 9 g. of a solid having a melting temperature of 205–210° C.

This solid was poured into 20 cc. of 10% sulfuric acid, thereby obtaining a heavy viscous liquid which was washed with water, dried on $Na_2SO_4$, and distilled. That fraction (2 g.) with a boiling range of from 145° to 152° C. showed in the I.R. obsorption spectrum the characteristic band of the -CN group in the zone of 2250 cm.$^{-1}$.

The characteristic band of the carbonyl group was not present. Thus, the compound was

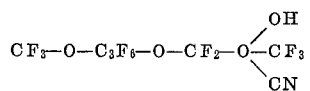

2 g. of this compound, $$CF_3—O—C_3F_6—O—CF_2—COH(CN)CF_3$$

thus isolated, were treated with 2 cc. of 80% sulfuric acid at a temperature of 100° C. for 2 hours. Thereafter the mixture was poured into water and the organic liquid was extracted with $CF_2Cl—CFCl_2$. Upon evaporation of the solvent, there was obtained 1.5 g. of a liquid showing an equivalent weight of 440 by alkaline saponification with an alcoholic KOH solution, and corresponding to a compound of the formula $$CF_3—O—C_3F_6—O—CF_2—COH(CF_3)—CONH_2$$

EXAMPLE 9

In this example there was employed a sample of 20 g. of a ketone mixture having a boiling temperature of 150°–190° C. at 1 mm. Hg, a chemical composition corresponding to the formula $CF_{1.99}O_{0.46}$, and an average molecular weight of 1,100, characterized by N.M.R. analysis by a ratio of 1:1.6 between —$OCF_2$— and —$C_3F_6O$— groups and by a ratio of 1:10 between

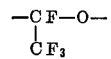

and —O—$CF_2$ groups, to which the following average formula was given:

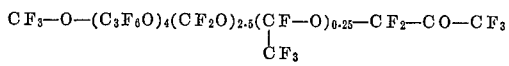

Through this sample a stream of gaseous $NH_3$ was bubbled over a three hour period while keeping the whole at a temperature of 0° C. During this time the viscosity of the liquid phase gradually increased. Thereafter, the product was heated to 50° C. under a vacuum of 25 mm. Hg. After this treatment, I.R. examination of the product showed the complete absence of the characteristic bands of the carbonyl group (1803 cm.$^{-1}$) and the presence of bands at 3650–3100 cm.$^{-1}$ characteristic of the —OH and —$NH_2$ groups.

The N.M.R analysis of this product did not show variations in the ratio between —$CF_2O$— and —$C_3F_6O$— units or between —$CF_2O$— and

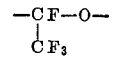

units.

A determination of the average molecular weight showed a value of 1,110 and a determination of the elemental composition showed a nitrogen content of 1.2%, corresponding to a compound of the formula

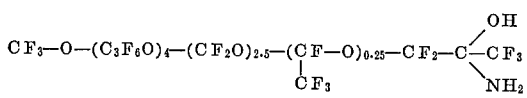

Variations can, of course, be made without departing from the spirit and scope of the invention.

Having thus described the invention, what is desired to be secured by Letters Patent and hereby claimed is:

1. A fluorinated compound having the formula

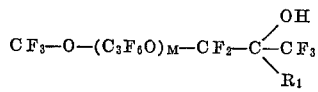

wherein M is zero or 1 and $R_1$ is —OH or —$OR_2$, $R_2$ being lower alkyl.

2. The compound of claim 1 having the formula

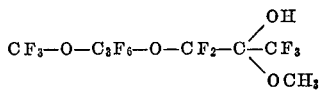

3. The compound of claim 1 having the formula

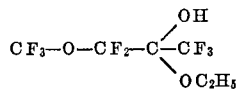

4. The compound of claim 1 having the formula

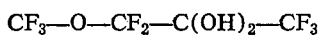

References Cited

UNITED STATES PATENTS 2,842,601  7/1958  Brace _____ 260—615
3,278,615  10/1966  Larsen _____ 260—615X

OTHER REFERENCES

Flory, Principles of Polymer Chemistry, Cornell University Press, New York, 1953, p. 182.

Wagner & Zook, Synthetic Organic Chemistry, John Wiley & Sons, Inc., New York, 1953, pp. 604–605.

CHARLES B. PARKER, Primary Examiner

C. F. WARREN, Assistant Examiner

U.S. Cl. X.R.

260—33.2, 465.6, 561, 573, 584, 613, 615